E. B. CROCKER.
PRESSURE GAGE.
APPLICATION FILED JAN. 13, 1919.
1,346,941.  Patented July 20, 1920.
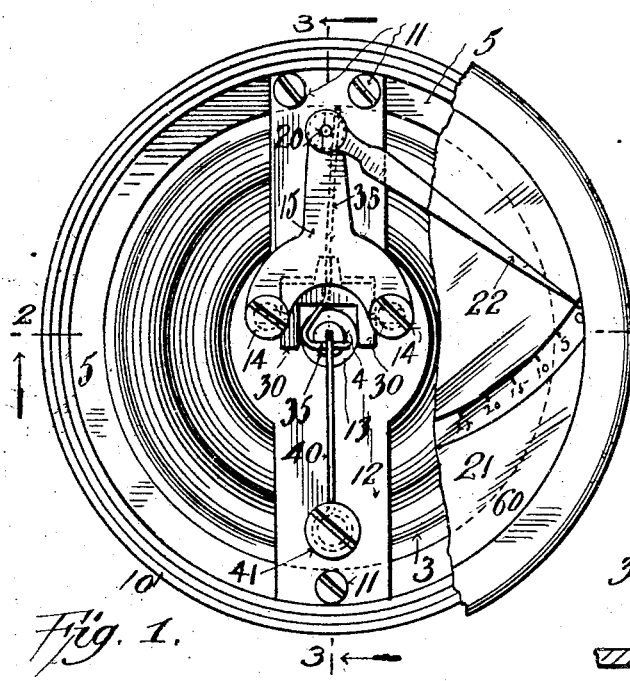
Fig. 1.
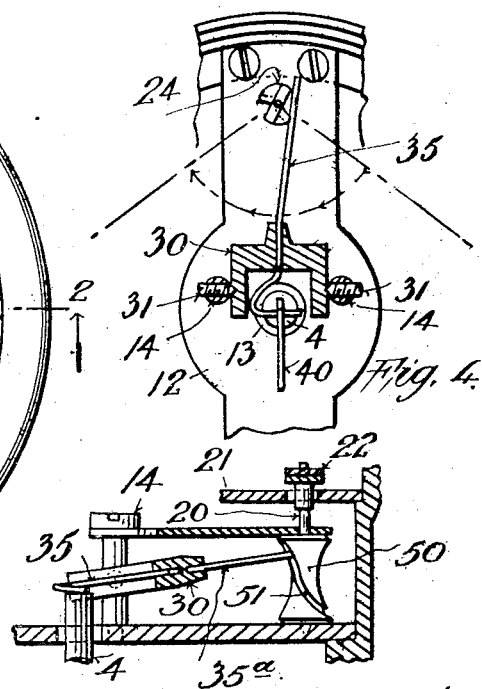
Fig. 4.
Fig. 5.
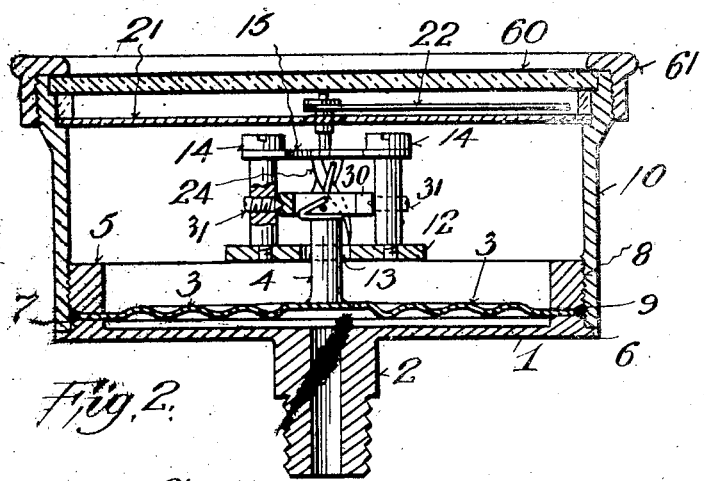
Fig. 2.
Fig. 6.
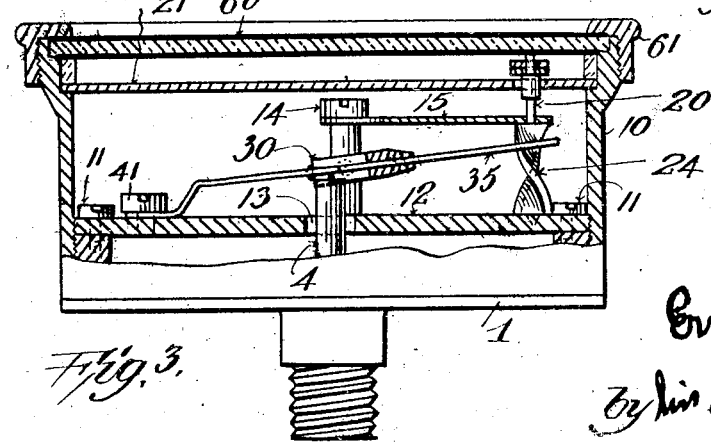
Fig. 3.
Fig. 7.
Inventor
Ernest B. Crocker
By his atty Samuel E. Darby

UNITED STATES PATENT OFFICE.

ERNEST B. CROCKER, OF STRATFORD, CONNECTICUT, ASSIGNOR TO THE ASHCROFT MANUFACTURING COMPANY, OF BRIDGEPORT, CONNECTICUT, A CORPORATION OF CONNECTICUT.

PRESSURE-GAGE.

1,346,941.  Specification of Letters Patent.  Patented July 20, 1920.

Application filed January 13, 1919. Serial No. 270,807.

*To all whom it may concern:*

Be it known that I, ERNEST B. CROCKER, a citizen of the United States, residing at Stratford, county of Fairfield, State of Connecticut, have made a certain new and useful Invention in Pressure-Gages, of which the following is a specification.

This invention relates to pressure gages.

The object of the invention is to provide a pressure gage which is economical of manufacture, efficient in operation, and which is exceedingly strong, durable and insusceptible to derangement due to shock or vibration.

A further object of the invention is to provide pressure gages of the diaphragm type.

A further object of the invention is to provide a pressure gage which is small and compact employing a diaphragm positioned in a plane parallel to the plane of movement of the pointer.

Further objects of the invention will appear more fully hereinafter.

The invention consists substantially in the construction, combination, location, and relative arrangement of parts, all as will be more fully hereinafter set forth, as shown by the accompanying drawing, and finally pointed out in the appended claims.

Referring to the drawing:

Figure 1 is a top plan view, parts broken away, of a pressure gage embodying my invention.

Fig. 2 is a sectional view of the same, taken on the line 2, 2 Fig. 1, and looking in the direction of the arrows.

Fig. 3 is a similar view taken on the line 3, 3, Fig. 1, looking in the direction of the arrows.

Fig. 4 is a top plan, partially in section, of the pointer actuating mechanism employed in accordance with my invention.

Fig. 5 is a view in sectional elevation of a modified construction embodying my invention.

Fig. 6 is a fragmentary detail view, partially in section, showing the relation between the arbor and the actuating lever employed in accordance with my invention.

Fig. 7 is a broken detail view in side elevation of a modified construction embodying my invention.

The same part is designated by the same reference character wherever it occurs throughout the several views.

Pressure-gages employing the principle of the Bourdon tube are well known in the art. The great disadvantage of gages of this nature, however, is that the gage is not stable due to the fact that the tube becomes deranged or injured with slight shock or vibration to the gage. Further, tubes of this nature are comparatively expensive to manufacture and maintain in operative condition. On account of these and other considerations diaphragm gages, that is, gages which are actuated by the movement of a diaphragm are preferable especially for low pressure work. It has been the practice heretofore, however, to position the diaphragm at right angles to the plane of movement of the arm or pointer. Such a construction has necessitated a comparatively large gage which does not eliminate the objections of derangement due to vibration and shock. It is among the special purposes of my present invention to provide a pressure gage of the diaphragm type wherein the diaphragm is positioned in a plane parallel to the plane of movement of the pointer arm and within the same casing for the entire gage, which casing is not enlarged to accommodate an angular disposition of the diaphragm relative to the pointer arm, thereby enabling the procurement of a small, compact, light, and sturdy gage of cheaper construction and less apt to be injured or deranged.

Referring to the drawing: I show a gage of this nature wherein I provide a base member 1 provided with a threaded nipple 2 to be placed in communication with the source of pressure to be measured. The inner end of the nipple is open to the under side of the diaphragm 3 which may be corrugated as shown. On the opposite side of the corrugated diaphragm 3 and centrally positioned thereon is a pin 4 which transmits the movement of the diaphragm to the pointer in a manner which will be more fully hereinafter described.

The entire operating mechanism of the gage of my invention, excepting the pin 4, which is carried by the diaphragm, is mounted on an annular ring 5. The base 1 of the gage is provided with an annular shoulder 6 the peripheral surface of which lies flush with the exterior surface of the case of the gage. An annular projection indicated at 7 forms a support for the circumferential edge of the diaphragm 3 and incidentally a sufficient play between the diaphragm and the inner surface of the base 1. The upper outer edge of the annular projection 7 of the base 1 is grooved or cut away at an angle as shown. The annular ring 5 is provided with threads 8 on the circumferential surface thereof and the bottom outermost edge thereof is cut away in the form of an annular groove. In assembling the gage the diaphragm 3 is positioned with its circumferential edge resting on the projection 7 of the base 1, and the annular ring 5 is positioned on top of the diaphragm as clearly shown in Fig. 2 thereby forming a groove between the lower circumferential edge of the ring 5 and the upper circumferential edge of the projection 7 of the base 1. The ring 5 and base 1 thus positioned are soldered or otherwise secured together as indicated at 9. As above explained, all of the working parts of the gage are carried by ring 5, and the outer casing 10 of the gage provided with interior threads engaging the exterior threads of the annular ring 5 is screwed into position with the lower edge thereof abutting against the circumferential projection 6 of the base 1 thus securing a neat, compact and sturdy gage construction.

I will now describe the operating parts of the gage. Suitably secured to the annular ring 5 in any suitable manner, for example, by means of screws 11, is a plate member 12, which extends diametrically across the body of the gage, and is provided with a central opening 13 through which the pin 4 carried by the diaphragm 3 extends. Suitably secured to the plate member 12, for example, by means of screws 14 on opposite sides of the diametrical axis of the plate 12 is an upper plate 15 which forms one guide and support for the pointer shaft, the operation of which will be more fully hereinafter described. The pointer shaft indicated at 20 extends through the dial plate 21 and has secured to the outer end thereof the pointer 22. The lower end thereof passes through the guide and supporting plate 15 and that portion thereof located beneath the guide or supporting plate 15 in one form of my invention is of a portion of a long pitch screw or spiral arbor as indicated at 24, the lower end of the same being pivotally supported by the plate 12 as clearly shown. It will be seen that as the arbor 24 is rotated in one direction or the other the pointer 22 will be actuated in one direction or the other. To secure relative movement of the shaft 20 and the pin 4 I mount a yoke 30 between the screws 14 and pivoted relative thereto in any suitable manner, for example, I have shown in the drawing one simple manner for effecting the pivotal movement of the yoke 30 wherein the same is supported between the ends of the screws 14 by means of cone screws 31 screwed through the screws 14, the cone end of which seats in depressions formed in the outer surfaces of the arms of the yoke 30. A wire 35 passing horizontally through the center of the pivotally mounted yoke 30 rests at one end on the top of the pin 4 and the other end bears against the surface of the screw portion 24 of the shaft 20 as clearly shown in Fig. 3. As the end of the wire 35 resting on the top surface of the pin 4 is on one side or fulcrum of the yoke 30 it will be apparent that as the pin 4 is raised due to pressure on the under side of the diaphragm 3 the yoke 30 is rocked on its pivot and consequently the wire 35 rides downwardly along the surface of the arbor 24 causing the same and consequently the shaft 20 and its pointer 22 to rotate in a degree proportional to the upward movement of the pin 4 as will be clearly understood. If desired, and as shown, a spring 40 secured to the plate 12 in any suitable manner, for example, by means of screws 41 passing through into plate 12 at one end thereof may be utilized to hold the end of the wire 35 in place on the top surface of the pin 4. It is further to be observed that by adjusting the wire 35 in the yoke 30 so that the end thereof may move closer to or farther away from the yoke 30, an adjustment of the leverage of the wire may be secured, which adjustment when once secured becomes fixed by means of the wire 40 as will be readily understood.

A most important feature of my invention is the position of the actuating arm 35 relative to the spiral arbor 24. Throughout the travel of the actuating arm 35 in its upward or downward path there are two points of contact constantly maintained between the same and the edges of the spiral arbor. This is clearly shown in Fig. 1 and in Fig. 6, the positioning in Fig. 4 not being quite so clear due to the fact that the position of the lever 35 is shown at a point midway between the top and bottom of the spiral arbor. The lever 35, it will be understood, contains sufficient resiliency to come in contact with both peripheral edges of the spiral and this prevents any back lash or lost motion in the pointer arm 22, thereby securing instantaneous and accurate relative movement of the pointer arm and the diaphragm.

Many other arrangements may be readily devised by those skilled in the art for accomplishing the actuation of the pointer 22 by means of the pin 4 without departing from the spirit and scope of my invention as defined in the claims, and therefore I do not desire to be limited or restricted to the particular form shown, for example, as illustrative of one modification which may be employed to accomplish the same result I show in Fig. 5 the shaft 20 formed in the shape of a spool 50 to replace the long pitch screw or spiral arbor 24 in the form shown in Fig. 3. In this form of my invention the arc of curvature of the spool 50 is struck from the fulcrum of the yoke 30. That is, the peripheral concave curvature of the spool 50 coincides with an arc struck from the fulcrum of the yoke 30 for a purpose which will be apparent. The face of the spool 50 is provided with a spirally cut groove indicated at 51 extending from the top to the bottom thereof. The front of the yoke 30 has fixed therein in a permanent position a wire or similar member 35ª, the free end of which rides in the groove 51 of the spool 50. As the yoke is moved upwardly or downwardly it will be apparent that the front end of the wire 35ª will follow the peripheral arc of the spool 50 in a straight vertical line and move in the groove 51 and will cause the spool to rotate in one direction or the other according to the direction of movement of the yoke 30. In this form of my invention the wire 35ᵇ through which the movement of the pin 4 is transmitted to the yoke 30 is a separate piece of wire or similar material and is in itself adjustably positioned relative to the yoke and pin in any suitable manner, for example, by sliding in a suitable hole cut in the yoke as shown. Reference has been made herein to the means employed in connection with Figs. 1, 2, 3 and 4, for preventing back lash or lost motion between the levers 35 and the spiral arbor 24. In connection with the present figure under description, namely, Fig. 5, the same result is accomplished inasmuch as the spiral groove 51 is of sufficient diameter to receive the arm or lever 35ª without lost motion as will be readily understood. It will be understood that the remaining details of the gage structure may be of the usual construction, for example, it may be provided with the glass plate 60 which is held in place by means of the usual or suitable rim 61 screwed over the upper edge of the case 10.

In Fig. 7 I show a still further modified construction wherein I employ a spring 60ª carried by a suitable support 61ª which acts as a fulcrum for the lever 35ᵇ which in turn is actuated by the pin 4 connected to the diaphragm coming in contact with the end 62 thereof. The spring 60ª is provided with a hook portion 63 which engages the under surface of the lever 35ᵇ and normally exerts an upward tension thereagainst maintaining the pointer at its zero reading. It will be understood that the pin 4 coming in contact with the under surface of the end 62 of the lever 35ᵇ causes the lever to move downwardly about its fulcrum 61ª against the action of the spring 60ª, and being in contact with the peripheral edges of the spiral arbor 24 causes the arbor to rotate in the manner hereinbefore described. A limiting arm 65 forms a limit for the upward movement of the lever 35ᵇ due to the action of the spring.

The practical advantages of a gage of the foregoing construction are apparent, and while the same is especially applicable for use with low pressure I do not desire to be limited to the use in connection with any particular style of pressure as the gage is of great utility due to the fact that the use of a large diaphragm made very stiff is possible and therefore due to the size of the diaphragm and its stiffness, less liable to derangement by shock or vibration.

Many other modifications and changes in detail will readily occur to those skilled in the art without departing from the spirit and scope of my invention, but having now set forth the objects and nature thereof, and having shown and described a construction embodying the principles of my said invention, what I claim as new and useful and of my own invention and desire to secure by Letters Patent is,—

1. In a pressure gage, a base member having an annular shoulder, a case to which the base member is fitted for said shoulder to rest against the edge of the case, a ring fitting in said case, a diaphragm held at its edge between said base member and ring, a pin carried by said diaphragm, a frame member supported by said ring, said pin working freely through an opening in said frame member, supports carried by said frame member, a yoke fulcrumed upon said supports, an arm carried by said yoke and having a portion arranged in the path of movement of said pin, a pointer, an arbor therefor, said arbor having a spiral portion, said arm arranged to engage and work against the surface of said spiral portion.

2. In a pressure gage, a case, a ring secured within said case, a base fitted to said case and secured to said ring, a diaphragm secured at its edge between said ring and base, a plate supported at its ends upon and extending diametrically across said ring, a pointer, a supporting shaft therefor, said shaft being held and supported by said plate and formed with a spiral portion, an arm pivotally mounted upon said plate and arranged to engage and work against said spiral portion, and a pin carried by said diaphragm and arranged to engage and rock said arm.

3. In a pressure gage, a case, a diaphragm arranged within the case, a plate mounted within and extending transversely across the case, a shaft supported on said plate and maintained against longitudinal movement, said shaft having a spiral portion, a pointer carried by said shaft and arranged to operate in a plane parallel to said diaphragm, a lever arm pivotally supported upon said plate and arranged to engage the spiral portion of said shaft, and a pin carried by said diaphragm and arranged to engage said lever arm to rock the same, said pin working freely through said plate.

4. In a pressure gage, a case, a diaphragm arranged within the case, a plate mounted within and extending transversely across the case, a shaft supported on said plate and maintained against longitudinal movement, said shaft having a spiral portion, a pointer carried by said shaft and arranged to operate in a plane parallel to said diaphragm, a lever arm pivotally supported intermediate its ends upon said plate, one end of said lever arm arranged to engage the spiral portion of said shaft, and a pin carried by said diaphragm and arranged to engage the other arm of said lever arm.

In testimony whereof I have hereunto set my hand on this 9th day of January A. D., 1919.

ERNEST B. CROCKER.